(12) United States Patent
Ko

(10) Patent No.: US 11,249,583 B2
(45) Date of Patent: Feb. 15, 2022

(54) TOUCH SYSTEM AND METHOD FOR ADJUSTING SPACING BETWEEN INK OBJECTS AND COMPUTER-READABLE MEDIUM

(71) Applicant: Acer Incorporated, New Taipei (TW)

(72) Inventor: Chueh-Pin Ko, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 17/118,632

(22) Filed: Dec. 11, 2020

(65) Prior Publication Data

US 2021/0357092 A1 Nov. 18, 2021

(30) Foreign Application Priority Data

May 12, 2020 (TW) .................................. 109115750

(51) Int. Cl.
*G06F 3/041* (2006.01)
*G06F 3/0354* (2013.01)
*G06F 40/171* (2020.01)
*G06F 3/04845* (2022.01)

(52) U.S. Cl.
CPC ...... *G06F 3/04162* (2019.05); *G06F 3/03545* (2013.01); *G06F 3/04845* (2013.01); *G06F 40/171* (2020.01); *G06F 2203/04108* (2013.01)

(58) Field of Classification Search
CPC . G06F 3/04162; G06F 40/171; G06F 3/03545
See application file for complete search history.

(56) References Cited

U.S. PATENT DOCUMENTS

| 2015/0052477 | A1* | 2/2015 | Yim | G06F 3/04883 715/800 |
| 2016/0124617 | A1* | 5/2016 | Ryu | G06F 3/04847 715/767 |
| 2018/0081535 | A1* | 3/2018 | Murakawa | G06F 40/171 |
| 2019/0340227 | A1* | 11/2019 | Sun | G06F 3/04847 |

FOREIGN PATENT DOCUMENTS

TW 201447731 12/2014

* cited by examiner

*Primary Examiner* — Chun-Nan Lin
(74) *Attorney, Agent, or Firm* — JCIPRNET

(57) ABSTRACT

A touch system and a touch method for adjusting a spacing between ink objects and a computer-readable medium are provided. The touch system includes a stylus device and a touch device. The stylus device is configured to emit a hover signal. The touch device includes a touch panel and a processing circuit. The processing circuit is coupled to the touch panel to detect and determine whether the hover signal is located in at least one junction area between the ink objects on the touch panel. When the hover signal is located in the junction area between two adjacent ink objects in the ink objects, the processing circuit obtains hover data of the stylus device and adjusts a size of the junction area between the two adjacent ink objects according to the hover data.

17 Claims, 7 Drawing Sheets

TOUCH SYSTEM AND METHOD FOR ADJUSTING SPACING BETWEEN INK OBJECTS AND COMPUTER-READABLE MEDIUM

CROSS-REFERENCE TO RELATED APPLICATION

This application claims the priority benefit of Taiwan application serial no. 109115750, filed on May 12, 2020. The entirety of the above-mentioned patent application is hereby incorporated by reference herein and made a part of this specification.

BACKGROUND

Technical Field

The disclosure relates to a touch system, and in particular to a touch system and a touch method for adjusting a spacing between ink objects and a computer-readable medium.

Description of Related Art

With the trend of the digital age, various types of writings or drawings have adopted digital forms. Some portable electronic devices such as smartphones, tablet computers, graphics tablets, touchscreen laptops, etc. may be used with styluses to provide users to intuitively write or draw on the touch panels.

However, in the process of writing by the user, writing errors may occur, but conventional touch systems (using the stylus for writing or drawing) cannot insert a writing content just by moving a cursor as in the typing mode. Accordingly, how to design a touch system capable of inserting other content into a writing content so that the writing content is correct is one of the topics researched by persons skilled in the art.

SUMMARY

The disclosure provides a touch system and a touch method for adjusting a spacing between ink objects and a computer-readable medium, which can insert a new ink object between multiple ink objects.

The touch system for adjusting a spacing between multiple ink objects of the disclosure includes a stylus device, for emitting a hover signal; and a touch device, including a touch panel and a processing circuit coupled to the touch panel to detect and determine whether the hover signal is located in at least one junction area between multiple ink objects on the touch panel, wherein when the hover signal is located in the junction area between two adjacent ink objects in the multiple ink objects, the processing circuit obtains hover data of the stylus device and adjusts a size of the junction area between the two adjacent ink objects according to the hover data.

The touch method for adjusting a spacing between multiple ink objects of the disclosure includes the following steps. A hover signal is emitted by a stylus device. Whether the hover signal is located in at least one junction area between multiple ink objects on a touch panel of a touch device is detected and determined by a processing circuit of the touch device. Hover data of the stylus device is obtained when the hover signal is located in the junction area between two adjacent ink objects in the multiple ink objects. A size of the junction area between the two adjacent ink objects is adjusted according to the hover data by the processing circuit.

The non-transitory computer-readable medium of the disclosure is configured to record a computer program, wherein the computer program is loaded via a processing circuit of a touch device to perform the following steps. A hover signal is emitted by a stylus device. Whether the hover signal is located in at least one junction area between multiple ink objects on a touch panel of the touch device is detected and determined by the processing circuit. Hover data of the stylus device is obtained when the hover signal is located in the junction area between two adjacent ink objects in the multiple ink objects. A size of the junction area between the two adjacent ink objects is adjusted according to the hover data by the processing circuit.

Based on the above, the touch system and the touch method for adjusting the spacing between ink objects and the computer-readable medium provided by the embodiments of the disclosure can increase the size of the spacing between two adjacent ink objects according to a hover height of the stylus device when the stylus device is hovering between the two adjacent ink objects on the touch panel. Moreover, when the stylus device is writing a new ink object between two adjacent ink objects, the size of the spacing between the two adjacent ink objects is continuously increased. In this way, the new ink object can be inserted between the two adjacent ink objects.

To make the aforementioned and other features of the disclosure more comprehensible, several embodiments accompanied with drawings are described in detail as follows.

DETAILED DESCRIPTION OF DISCLOSED EMBODIMENTS

Generally speaking, when a stylus is within a certain distance from a touch panel, the stylus will change the values sensed by the touch panel, so that a touch device may detect the presence of the stylus. Based on such characteristic, the disclosure uses the sensing result of the touch panel to detect whether the stylus is located between multiple ink objects on the touch panel. In addition, the touch device may also use a processing circuit to obtain distance data between the stylus and the touch panel. In this way, based on the location of the stylus and the distance between the stylus and the touch panel, the touch device may adjust a spacing between ink objects in a writing content, so that the stylus may insert or write a missing content in the spacing. In order to make the content of the disclosure clearer, the following embodiments are listed as examples on which the disclosure can indeed be implemented.

Figure 1:
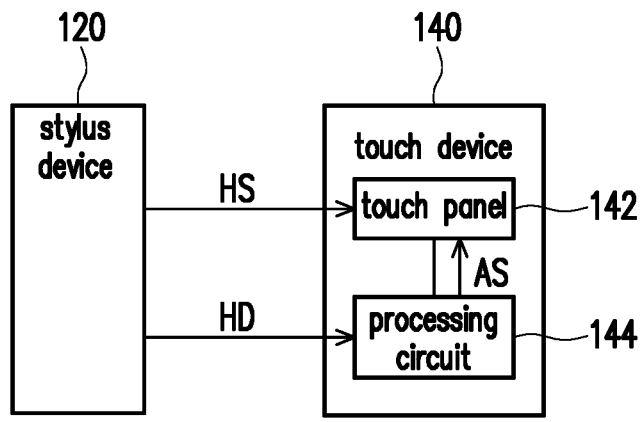
FIG. 1 is a block diagram of a touch system for adjusting a spacing between multiple ink objects according to an embodiment of the disclosure.

FIG. 1 is a block diagram of a touch system for adjusting a spacing between multiple ink objects according to an embodiment of the disclosure. Referring to FIG. 1, a touch system 100 includes a stylus device 120 and a touch device 140. The stylus device 120 of the embodiment is, for example, a capacitive, electromagnetic, optical, or other active stylus, and the disclosure is not limited thereto. The touch device 140 of the embodiment is, for example, a touch device having a touch screen such as a smartphone, a personal digital assistant (PDA), an e-book, a game console, etc., and the disclosure is not limited thereto. The touch device 140 includes a touch panel 142 and a processing circuit 144, and the functions thereof are described as follows.

The touch panel 142 is a display device integrated with touch detection elements, which can simultaneously provide display and input functions. The display device is, for example, a liquid crystal display (LCD), a light-emitting diode (LED) display, a field emission display (FED), or other types of displays, and the disclosure is not limited thereto. The touch detection elements are disposed on the display device. The touch detection elements are arranged in rows and columns, and are configured to receive a touch event or a hover event. The touch event includes a finger, palm, body part, or other objects (such as stylus) touching the touch panel 142. In the embodiment, the touch event is the stylus device 120 being in contact with the touch panel 142 (with pressure output), that is, the status of ink output. The hover event includes a finger, palm, body part, or other objects (such as stylus) hovering above the touch panel 142. In the embodiment, the hover event is the stylus device 120 not being in contact with the touch panel 142 (without pressure output), but being maintained within a detectable range of the touch panel 142, that is, in a hover state. The touch detection elements may be, for example, capacitive touch detection elements, surface acoustic wave touch detection elements, electromagnetic touch detection elements, near-field imaging touch detection elements, and the like.

The processing circuit 144 is, for example, a central processing unit (CPU), other programmable general-purpose or special-purpose microprocessor, micro control unit (MCU), digital signal processor (DSP), programmable control unit, application specific integrated circuits (ASIC), programmable logic device (PLD), other similar devices, or a combination of the aforementioned devices. The processing circuit 144 is coupled to the touch panel 142. A software program may be accessed and executed by the micro control unit to execute the operation of adjusting the spacing between multiple ink objects on the touch panel 142.

Figure 2:
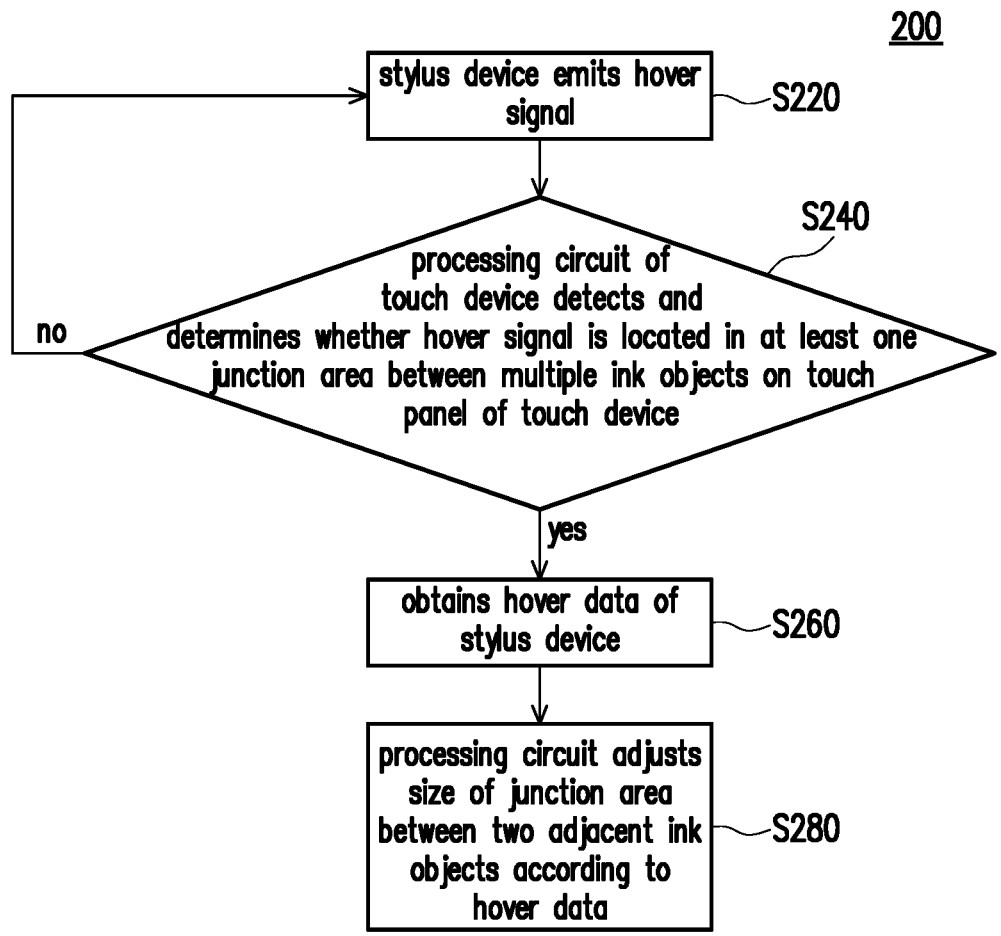
FIG. 2 is a flowchart of a touch method for adjusting a spacing between multiple ink objects according to an embodiment of the disclosure.

FIG. 2 is a flowchart of a touch method for adjusting a spacing between multiple ink objects according to an embodiment of the disclosure. Referring to FIG. 2, a touch method 200 of the embodiment is applicable to the touch system 100 of FIG. 1. The detailed steps of the touch method according to the disclosure will be described as follows with the various elements of the touch system 100. It should be particularly noted here that the multiple ink objects in the embodiment are, for example, character strings, characters, letters, or numbers, and the disclosure is not limited thereto.

Please refer to FIG. 1 and FIG. 2 at the same time. The stylus device 120 may emit a hover signal HS in Step S220. Specifically, during a period when the stylus device 120 approaches the touch panel 142, when the stylus device 120 is within a certain distance from the touch panel 142, the stylus device 120 may emit the hover signal HS to the touch panel 142.

In Step S240, the processing circuit 144 of the touch device 140 detects and determines whether the hover signal HS is located in at least one junction area between multiple ink objects on the touch panel 142 of the touch device 140. The junction area may be a blank space between two adjacent handwritings (image objects). In detail, the processing circuit 144 may detect the hover signal HS emitted by the stylus device 120 by the touch detection elements of the touch panel 142 and determine whether the hover signal HS is located in at least one junction area between multiple ink objects on the touch panel 142 of the touch device 140.

In an embodiment, the processing circuit 144 first determines whether there are multiple ink objects on the touch panel 142. When the processing circuit 144 determines that there are multiple ink objects on the touch panel 142, the processing circuit 144 further detects and determines whether the hover signal HS is located in at least one junction area between the multiple ink objects on the touch panel 142.

The specific method of determining whether the hover signal HS is located in at least one junction area between the multiple ink objects on the touch panel 142 of the touch device 140 is exemplified as follows in the embodiment.

Figure 3A:
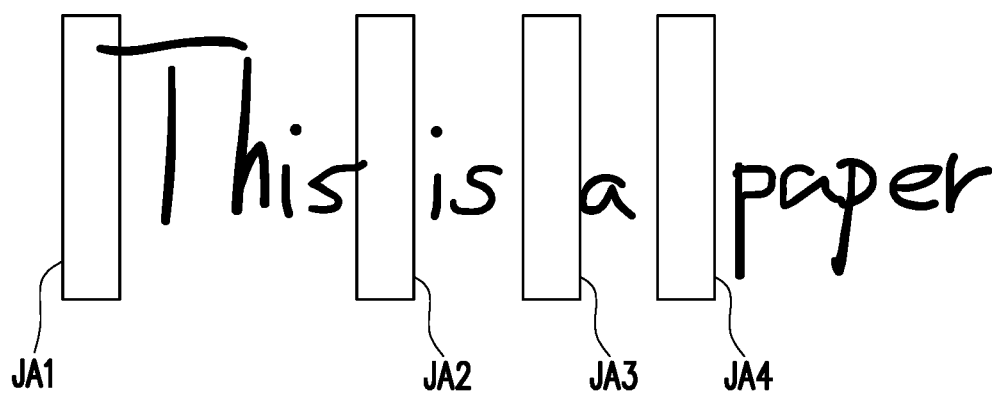
FIG. 3A and FIG. 3B are schematic diagrams of multiple ink objects on a touch panel according to some embodiments of the disclosure.
Figure 3B:
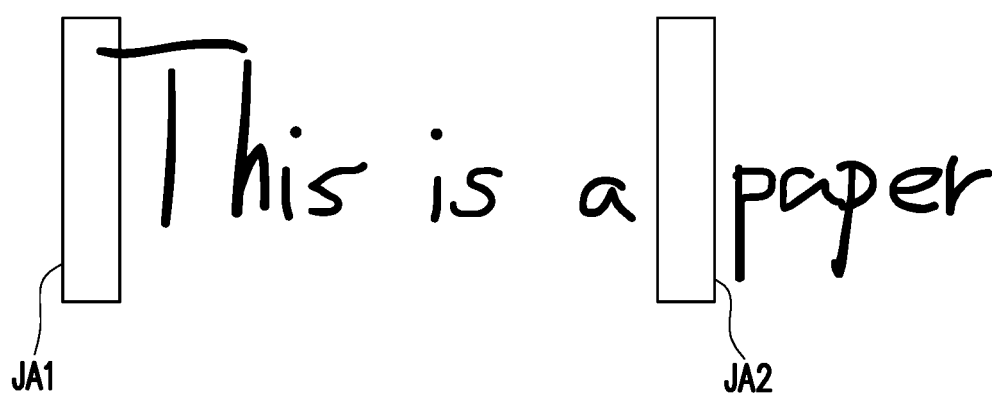

FIG. 3A and FIG. 3B are schematic diagrams of multiple ink objects on a touch panel according to some embodiments of the disclosure. The user may operate the stylus device 120 to write a character string "This is a paper" as shown in FIG. 3A on the touch panel 142. The character string is an image object instead of a text object. The processing circuit 144 may distinguish/divide the character string (image object) into ink objects "This", "is", "a", and "paper". There are a junction area JA2 between the ink objects "This" and "is", a junction area JA3 between the ink objects "is" and "a", and a junction area JA4 between the ink objects "a" and "paper". Furthermore, in an embodiment, there is a junction area JA1 at the other side of the ink object "This" at the forefront of the character string relative to the ink object "is". Therefore, in the embodiment, by the detection of the touch detection elements of the touch panel 142, the processing circuit 144 may determine whether the hover signal HS emitted by the stylus device 120 is located in the junction area JA1, JA2, JA3, or JA4.

FIG. 3B shows a processing example different from FIG. 3A. The processing circuit 144 may distinguish/divide the character string "This is a paper" (image object) into ink objects "This is a" and "paper". There is a junction area JA2 between the ink objects "This is a" and "paper". Moreover, in an embodiment, there is a junction area JA1 at the other side of the ink object "This is a" at the forefront of the character string relative to the ink object "paper". Therefore, in the embodiment, by the detection of the touch detection elements of the touch panel 142, the processing circuit 144 may determine whether the hover signal HS emitted by the stylus device 120 is located in the junction area JA1 or JA2.

Returning to the flowchart of FIG. 2, when there is no hover signal HS at the location of the junction area between two adjacent ink objects (determination result of Step S240 is "no"), the processing circuit 144 returns to Step S220.

When the processing circuit 144 detects and determines that the hover signal HS is located in the junction area between two adjacent ink objects in multiple ink objects (determination result of Step S240 is "yes"), the processing circuit 144 may perform Step S260. In Step S260, the processing circuit 144 obtains a hover data HD of the stylus device 120. In an embodiment, the stylus device 120 may transmit the hover data HD to the processing circuit 144 via the touch panel 142. In yet another embodiment, the stylus device 120 may directly transmit the hover data HD to the processing circuit 144 through other wireless channels (such as Bluetooth). In another embodiment, the hover data HD may be obtained after the touch detection elements of the touch panel 142 detect the stylus device 120 and may be transmitted to the processing circuit 144 by the touch panel 142. It is also worth noting that the hover data HD may include at least one of the height from the stylus device 120 to the touch panel 142, the intensity change of the hover signal HS, and the time difference of the hover signal HS. In an embodiment, the processing circuit 144 may execute the software program by the micro control unit to obtain the time difference of the hover signal HS.

In Step S280, the processing circuit 144 adjusts the size of the junction area between two adjacent ink objects according to the hover data HD. Specifically, when the height from the stylus device 120 to the touch panel 142 is lower than a height threshold and the writing portion (for example, nib portion) of the stylus device 120 is located in the junction area between two adjacent ink objects, the processing circuit 144 may transmit an adjustment signal AS to the touch panel 142 to increase the size of the junction area between the two adjacent ink objects. In an embodiment, the height threshold may be 10 mm. However, the height threshold may depend on the material of the nib, electrical design, and stylus communication method, and the disclosure is not limited thereto. In an embodiment, the processing circuit 144 may execute the software program by the micro control unit to adjust the size of the junction area between two adjacent ink objects.

In addition, in an embodiment, the processing circuit 144 further determines whether the stylus device 120 writes a new ink object in the junction area between two adjacent ink objects. When the stylus device 120 is writing the new ink object in the junction area between the two adjacent ink objects, the processing circuit 144 increases the size of the junction area between the two adjacent ink objects to accommodate the new ink object. In particular, in the process of the stylus device 120 writing the new ink object, the processing circuit 144 correspondingly increases the size of the junction area between the two adjacent ink objects according to the size of the new ink object until the stylus device 120 leaves the junction area of the touch panel 142.

In an embodiment, the processing circuit 144 may increase the size of the junction area not in a fixed proportion. For example, the size of the junction area may increase as the height from the stylus device 120 to the touch panel 142 decreases. The height and amplification ratio of the junction area may be of an exponential relationship, a linear relationship, or other corresponding relationships that enables the amplification effect to be obvious. In some embodiments, the size of the amplified junction area may be more than twice the original size of the junction area, and the disclosure is not limited thereto.

The two adjacent ink objects include a left ink object and a right ink object. In an embodiment, the processing circuit 144 maintains the location of the left ink object and moves the right ink object rightward to increase the size of the junction area between the left ink object and the right ink object. That is, the processing circuit 144 may fix the front object and move the rear object backward according to the writing direction. In an embodiment, different writing directions including vertical, horizontal, left-to-right, right-to-left, top-to-bottom, etc. may be supported. In addition, some software will convert a written digital ink content into a digital text content, since the original content is an ink object, such ink object is also supported.

It should be noted that the above design is based on the convenience and intuition of the user. The visual effect of the amplified junction area using ways, such as color change, appearance of bubbles, squares, or dotted lines, etc. are not limited thereto.

It is worth mentioning that when the hover location of the stylus device 120 is before a first ink object, there is still a blank object before the visible first ink object, so the touch method for adjusting the spacing between multiple ink objects of the embodiment is still applicable.

FIG. 4A to FIG. 4D are schematic diagrams of an example of adjusting a spacing between multiple ink objects according to an embodiment of the disclosure. FIG. 5 is a curve diagram of adjusting the spacing between multiple ink objects corresponding to FIG. 4A to FIG. 4D according to an embodiment of the disclosure. FIG. 4A to FIG. 4D show the example during different time intervals of FIG. 5 (corresponding to the steps of the flowchart shown in FIG. 2), and the character string "This is a paper" is taken as an example.

Figure 4A:
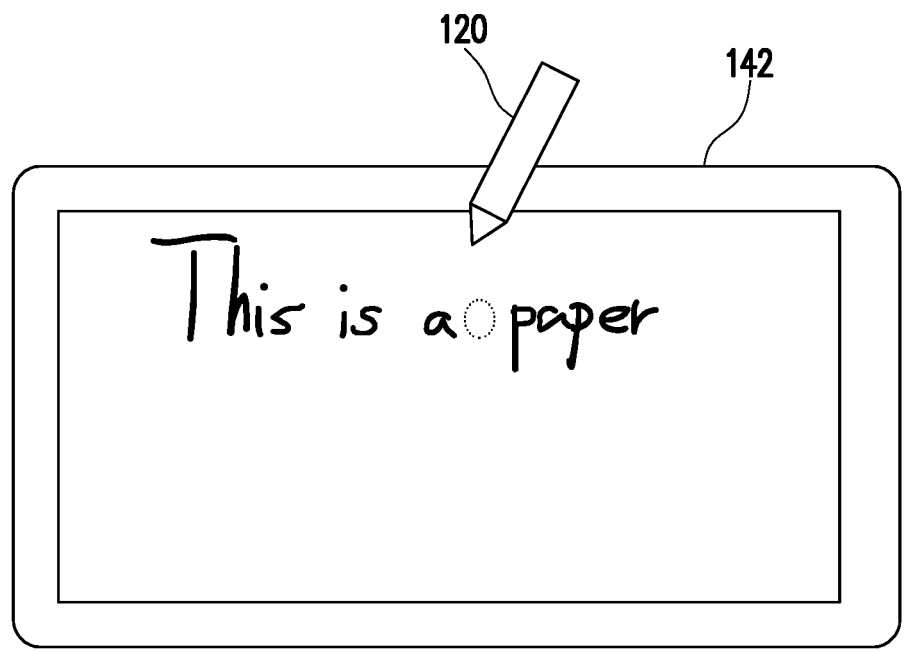
FIG. 4A to FIG. 4D are schematic diagrams of an example of adjusting a spacing between multiple ink objects according to an embodiment of the disclosure.
Figure 5:
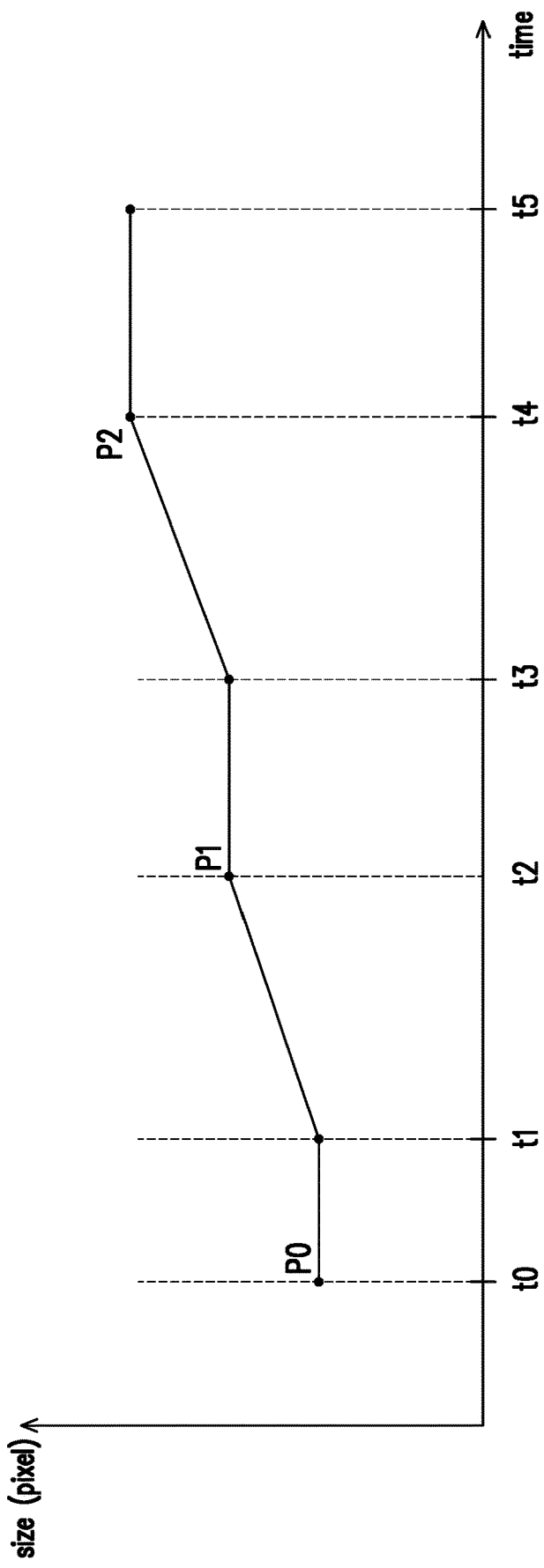
FIG. 5 is a curve diagram of adjusting the spacing between multiple ink objects corresponding to FIG. 4A to FIG. 4D according to an embodiment of the disclosure.

Please refer to FIG. 4A and FIG. 5 at the same time. FIG. 4A shows a schematic diagram of the example from a time t0 to a time t1 in FIG. 5. During the interval from the time t0 to the time t1, the writing portion of the stylus device 120 is located in the junction area between the two adjacent ink objects "a" and "paper" on the touch panel 142, and the distance between the stylus device 120 and the touch panel 142 is the height threshold. At this time, the size of the junction area is maintained at P0. For example, from the time t0 to the time t1, when the distance between the writing portion of the stylus device 120 and the touch panel 142 is 10 mm, the size of the spacing between the ink objects "a" and "paper" is P0.

Figure 4B:
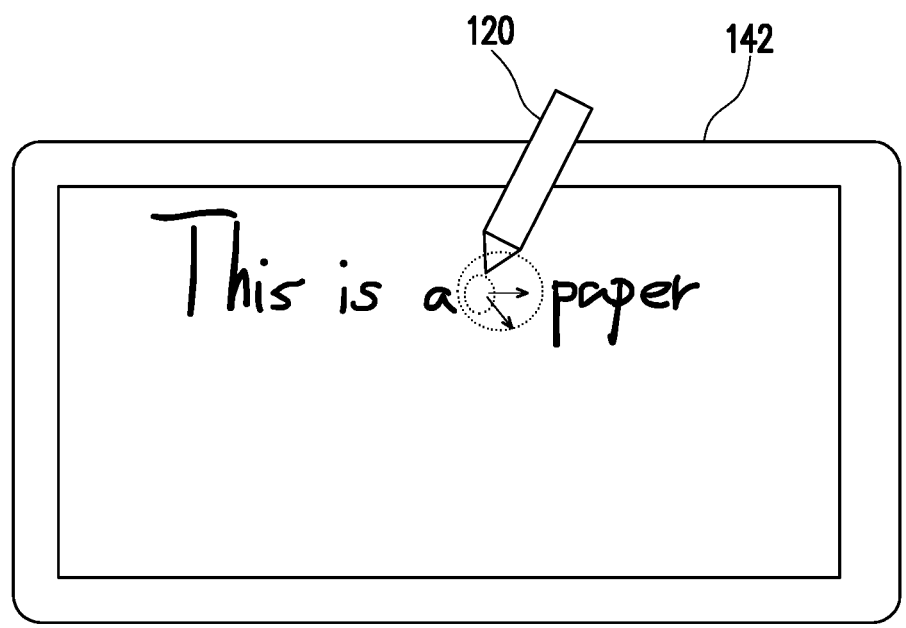

Please refer to FIG. 4B and FIG. 5 at the same time. FIG. 4B shows a schematic diagram of the example from the time t1 to a time t3 in FIG. 5. During the interval from the time t1 to a time t2, the writing portion of the stylus device 120 slowly approaches the touch panel 142, that is, the height from the stylus device 120 to the touch panel 142 is lower than the height threshold. At this time, the size of the junction area linearly increases from P0 to P1 according to the height from the stylus device 120 to the touch panel 142. During the interval from the time t2 to the time t3, the writing portion of the stylus device 120 is in contact with the touch panel 142. At this time, the size of the junction area is maintained at P1. For example, from the time t1 to the time t2, when the distance between the writing portion of the stylus device 120 and the touch panel 142 is reduced from 10 mm to 0 mm (that is, the stylus device 120 is in contact with the touch panel 142), the spacing between the ink objects "a" and "paper" linearly increases from P0 to P1.

In an embodiment, when the distance between the stylus device 120 and the touch panel 142 is maintained at the height threshold for a period of time (that is, the size of the junction area between the two adjacent ink objects "a" and "paper" is maintained at P0 for a period of time), the processing circuit determines that the stylus device 120 is writing a new ink object in the junction area between the two adjacent ink objects "a" and "paper", and the size of the junction area linearly increases (for example, automatically bounces apart) from P0 to P1.

Figure 4C:
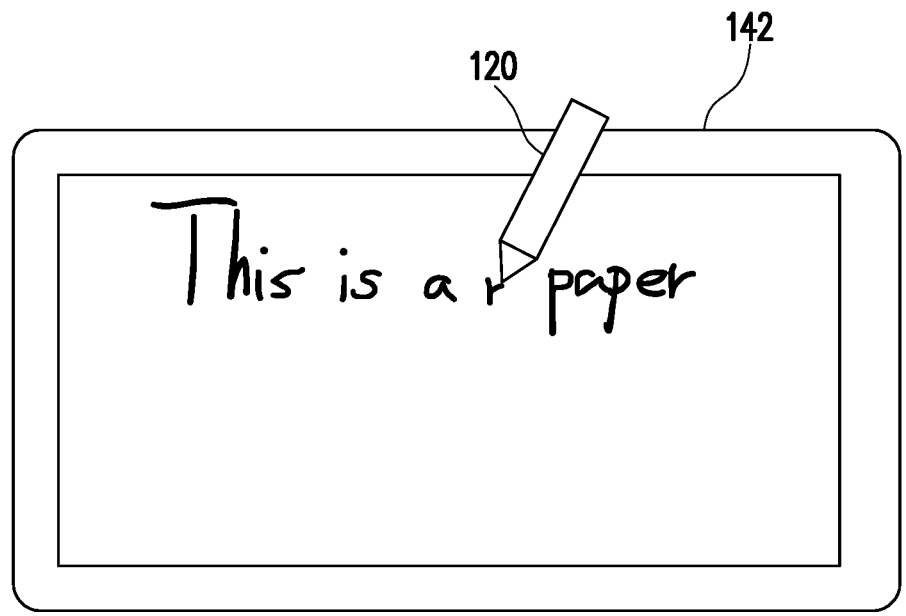

Please refer to FIG. 4C and FIG. 5 at the same time. FIG. 4C shows a schematic diagram of the example from the time t3 to a time t4 in FIG. 5. During the interval from the time t3 to the time t4, the stylus device 120 writes a new ink object "red" in the junction area between two the adjacent ink objects "a" and "paper". At this time, the size of the junction area linearly increases from P1 to P2 to accommodate the new ink object "red". It should be noted here that when writing from left to right, the right ink object "paper" needs to continue moving backward, so that the last location of the new ink object "red" continuously keeps the same distance from the right ink object "paper". Therefore, when writing the new ink object "red", the spacing between the ink objects "a" and "paper" linearly increases from P1 to P2.

Figure 4D:
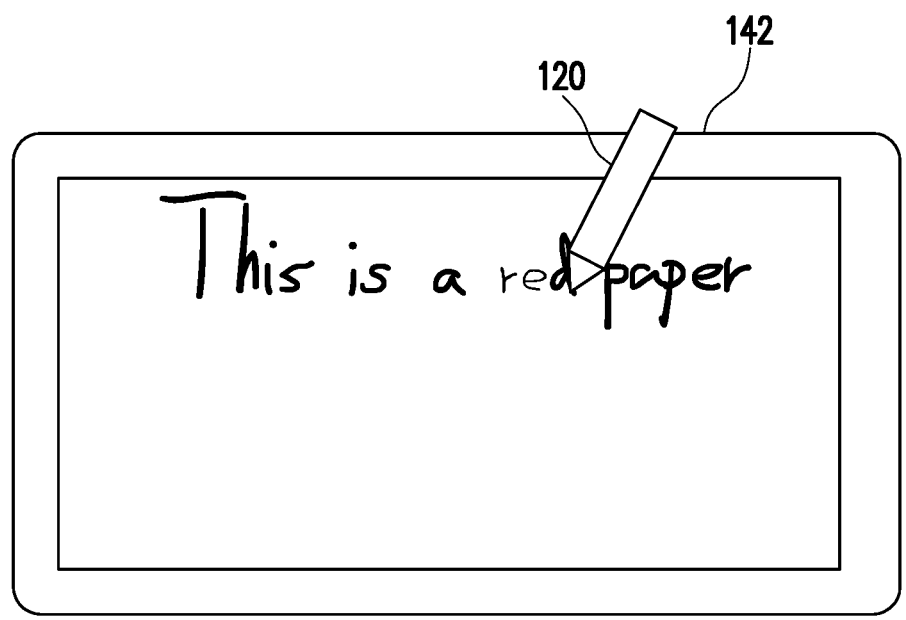

Please refer to FIG. 4D and FIG. 5 at the same time. FIG. 4D shows a schematic diagram of the example from the time t4 to a time t5 in FIG. 5. During the interval from the time t4 to the time t5, after writing the new ink object "red", the stylus device 120 leaves the junction area between the two adjacent ink objects "a" and "paper". At this time, the size of the junction area is still maintained at P2.

It is worth noting that although FIG. 4A to FIG. 4D are exemplified using English texts, mathematical equations, chemical equations, etc. may also be applied to the touch method according to the embodiments of the disclosure, whereby a missing content may be inserted into an equation, so that the content is correct.

Figure 6A:
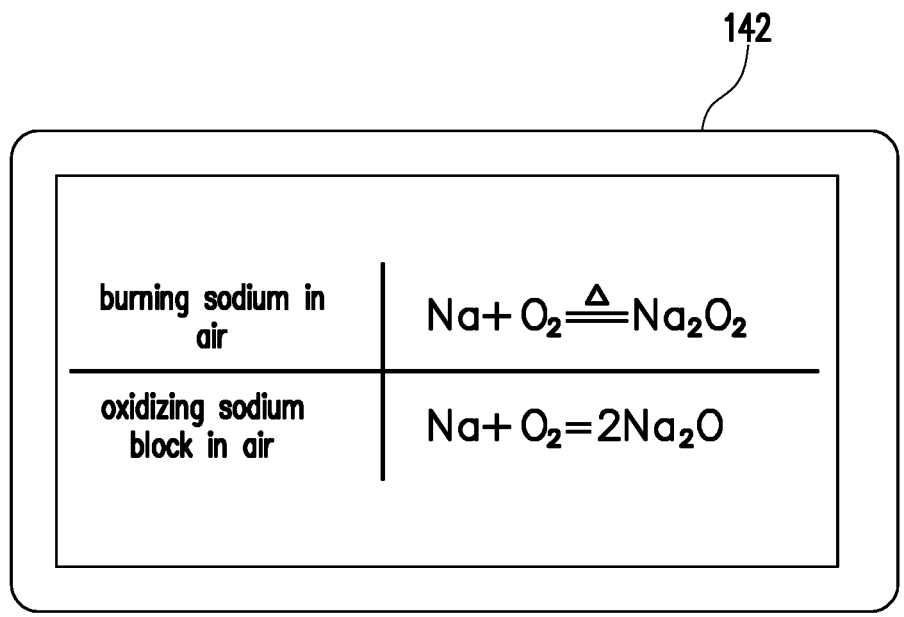
FIG. 6A and FIG. 6B are schematic diagrams of an example of inserting new ink objects according to an embodiment of the disclosure.
Figure 6B:
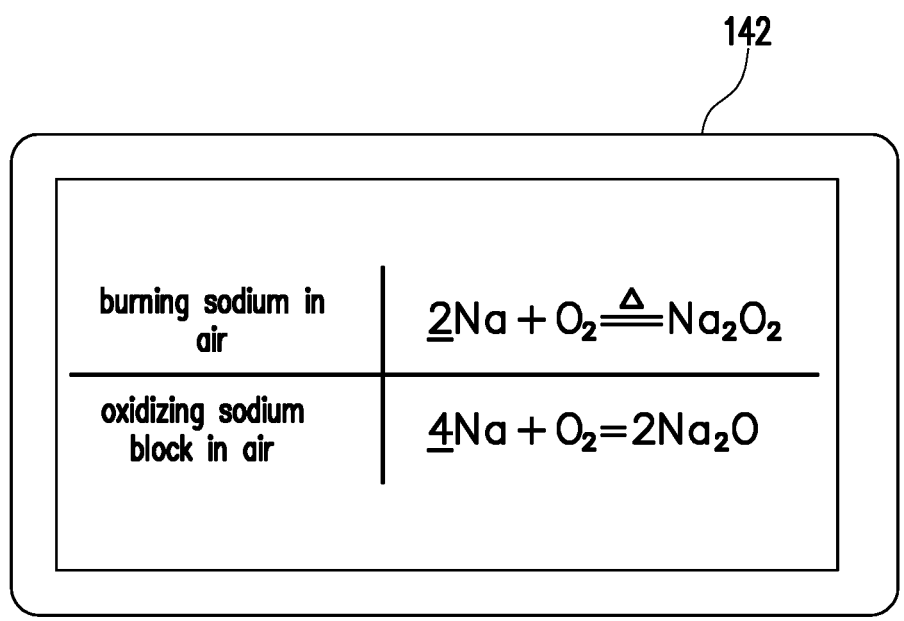

FIG. 6A and FIG. 6B are schematic diagrams of an example of inserting new ink objects according to an embodiment of the disclosure. FIG. 6A and FIG. 6B show the example of inserting new ink objects "2" and "4" into a chemical equation.

Figure 7A:
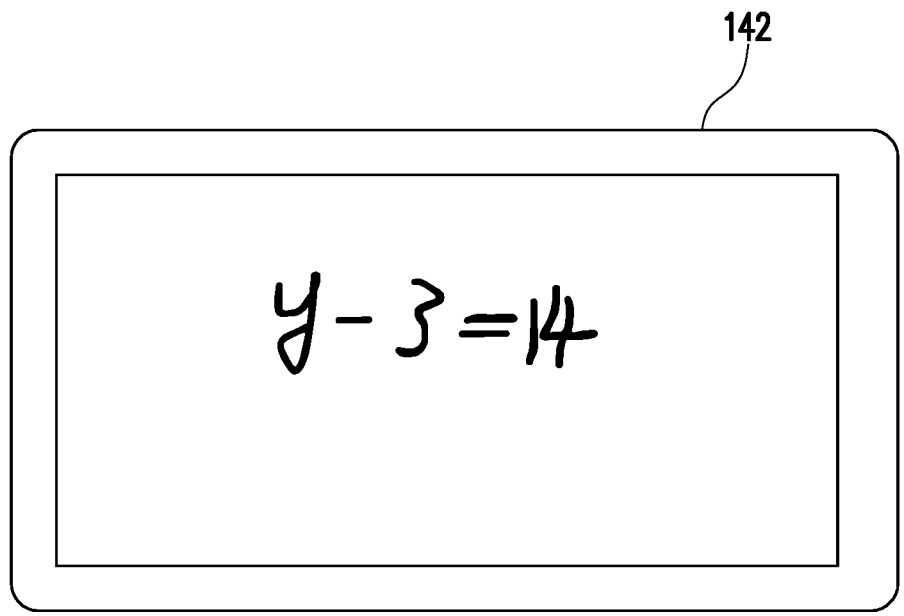
FIG. 7A and FIG. 7B are schematic diagrams of an example of inserting a new ink object according to another embodiment of the disclosure.
Figure 7B:
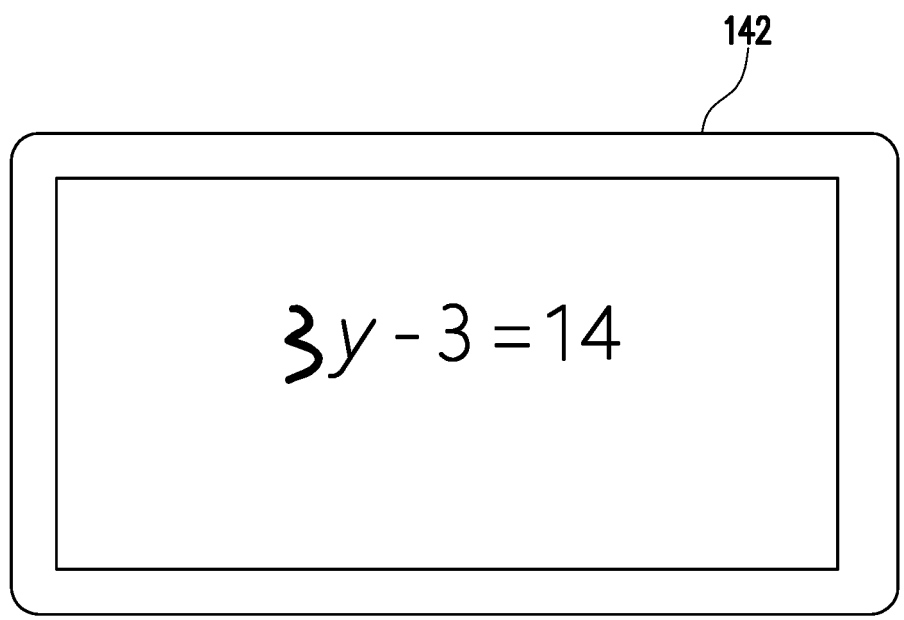

FIG. 7A and FIG. 7B are schematic diagrams of an example of inserting a new ink object according to another embodiment of the disclosure. FIG. 7A and FIG. 7B show the example of inserting a new ink object "3" into a mathematical equation. FIG. 7B converts pure digital ink on the touch panel 142 of FIG. 7A into digital texts, and then inserts the new ink object "3" into the digital texts.

The disclosure further provides a non-transitory computer-readable medium for recording a computer program. The computer program is configured to execute the steps of the touch method for adjusting the spacing between multiple ink objects. The computer program is composed of multiple code fragments (that is, code fragments for establishing organization chart, code fragments for signing form, code fragments for setting, and code fragments for deployment). In addition, after the code fragments are loaded into the processing circuit 144 of the touch device 140 and are executed, the steps of the touch method for adjusting the spacing between multiple ink objects may be implemented.

The non-transitory computer-readable medium refers to a medium (for example, a register, a cache memory, and a memory) that stores data semi-permanently instead of storing data within an extremely short time, and may be read by a device. Specifically, the various applications or programs above may be stored in, for example, the following non-transitory computer-readable mediums: compact disc (CD), digital versatile disk (DVD), hard disk, Blu-ray disc, universal serial bus (USB) memory stick, memory card, and read-only memory (ROM), which may provide the various applications or programs above.

In summary, the touch system and the touch method for adjusting the spacing between ink objects and the computer-readable medium provided by the embodiments of the disclosure can increase the size of the spacing between two adjacent ink objects according to the hover height of the stylus device when the stylus device is hovering between the two adjacent ink objects on the touch panel. Moreover, when the stylus device is writing a new ink object between two adjacent ink objects, the size of the spacing between the two adjacent ink objects is continuously increased. In this way, the new ink object can be inserted between the two adjacent ink objects.

Although the disclosure has been disclosed in the above embodiments, the embodiments are not intended to limit the disclosure. It will be apparent to persons skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A touch system for adjusting a spacing between a plurality of ink objects, comprising:
   a stylus device, for emitting a hover signal; and
   a touch device, comprising:
      a touch panel; and
      a processing circuit, coupled to the touch panel to determine whether the touch panel has the plurality of ink objects, and when the touch panel has the plurality of ink objects, the processing circuit detects and determines whether the hover signal is located in at least one junction area between the plurality of ink objects on the touch panel, wherein when the hover signal is located in the junction area between two adjacent ink objects in the plurality of ink objects, the processing circuit obtains hover data of the stylus device and adjusts a size of the junction area between the two adjacent ink objects according to the hover data.

2. The touch system according to claim 1, wherein the processing circuit determines whether the stylus device writes a new ink object in the junction area between the two adjacent ink objects, and when the stylus device is writing the new ink object in the junction area between the two adjacent ink objects, the processing circuit increases the size of the junction area between the two adjacent ink objects to accommodate the new ink object.

3. The touch system according to claim 2, wherein in a process of the stylus device writing the new ink object, the processing circuit increases the size of the junction area between the two adjacent ink objects according to a size of the new ink object until the stylus device leaves the junction area of the touch panel.

4. The touch system according to claim 1, wherein the hover data comprises at least one of a height from the stylus device to the touch panel, an intensity change of the hover signal, and a time difference of the hover signal.

5. The touch system according to claim 1, wherein when a height from the stylus device to the touch panel is lower than a height threshold and a writing portion of the stylus device is located in the junction area between the two adjacent ink objects, the processing circuit increases the size of the junction area between the two adjacent ink objects.

6. The touch system according to claim 5, wherein the two adjacent ink objects comprise a left ink object and a right ink object, the processing circuit maintains a location of the left ink object and moves the right ink object rightward to increase the size of the junction area between the left ink object and the right ink object.

7. A touch method for adjusting a spacing between a plurality of ink objects, comprising:
   emitting a hover signal by a stylus device;
   determining whether a touch panel of a touch device has the plurality of ink objects by a processing circuit of the touch device;
   detecting and determining whether the hover signal is located in at least one junction area between the plurality of ink objects on the touch panel by the processing circuit when the touch panel has the plurality of ink objects;
   obtaining hover data of the stylus device when the hover signal is located in the junction area between two adjacent ink objects in the plurality of ink objects; and
   adjusting a size of the junction area between the two adjacent ink objects according to the hover data by the processing circuit.

8. The touch method according to claim 7, further comprising:
   determining whether the stylus device writes a new ink object in the junction area between the two adjacent ink objects by the processing circuit; and
   increasing the size of the junction area between the two adjacent ink objects to accommodate the new ink object when the stylus device is writing the new ink object in the junction area between the two adjacent ink objects.

9. The touch method according to claim 8, further comprising:
   increasing the size of the junction area between the two adjacent ink objects according to a size of the new ink object until the stylus device leaves the junction area of the touch panel in a process of the stylus device writing the new ink object.

10. The touch method according to claim 7, wherein the hover data comprises at least one of a height from the stylus device to the touch panel, an intensity change of the hover signal, and a time difference of the hover signal.

11. The touch method according to claim 7, further comprising:
   increasing the size of the junction area between the two adjacent ink objects by the processing circuit when a height from the stylus device to the touch panel is lower than a height threshold and a writing portion of the stylus device is located in the junction area between the two adjacent ink objects.

12. A non-transitory computer-readable medium, for recording a computer program, wherein the computer program is loaded via a processing circuit of a touch device to:
   emit a hover signal by a stylus device;
   determine whether a touch panel of the touch device has a plurality of ink objects by the processing circuit;
   detect and determine whether the hover signal is located in at least one junction area between the plurality of ink objects on the touch panel by the processing circuit when the touch panel has the plurality of ink objects;
   obtain hover data of the stylus device when the hover signal is located in the junction area between two adjacent ink objects in the plurality of ink objects; and
   adjust a size of the junction area between the two adjacent ink objects according to the hover data by the processing circuit.

13. The non-transitory computer-readable medium according to claim 12, wherein the computer program is loaded via a processing circuit of a touch device to:
   determine whether the stylus device writes a new ink object in the junction area between the two adjacent ink objects by the processing circuit; and
   increase the size of the junction area between the two adjacent ink objects to accommodate the new ink object when the stylus device is writing the new ink object in the junction area between the two adjacent ink objects.

14. The non-transitory computer-readable medium according to claim 13, wherein the computer program is loaded via a processing circuit of a touch device to:
   increase the size of the junction area between the two adjacent ink objects according to a size of the new ink object until the stylus device leaves the junction area of the touch panel in a process of the stylus device writing the new ink object.

15. The non-transitory computer-readable medium according to claim 12, wherein the hover data comprises at least one of a height from the stylus device to the touch panel, an intensity change of the hover signal, and a time difference of the hover signal.

16. The non-transitory computer-readable medium according to claim 12, wherein the computer program is loaded via a processing circuit of a touch device to:
   increase the size of the junction area between the two adjacent ink objects by the processing circuit when a height from the stylus device to the touch panel is lower than a height threshold and a writing portion of the stylus device is located in the junction area between the two adjacent ink objects.

17. The non-transitory computer-readable medium according to claim 16, wherein the two adjacent ink objects comprise a left ink object and a right ink object, the processing circuit maintains a location of the left ink object and moves the right ink object rightward to increase the size of the junction area between the left ink object and the right ink object.

* * * * *